Patented Nov. 12, 1929

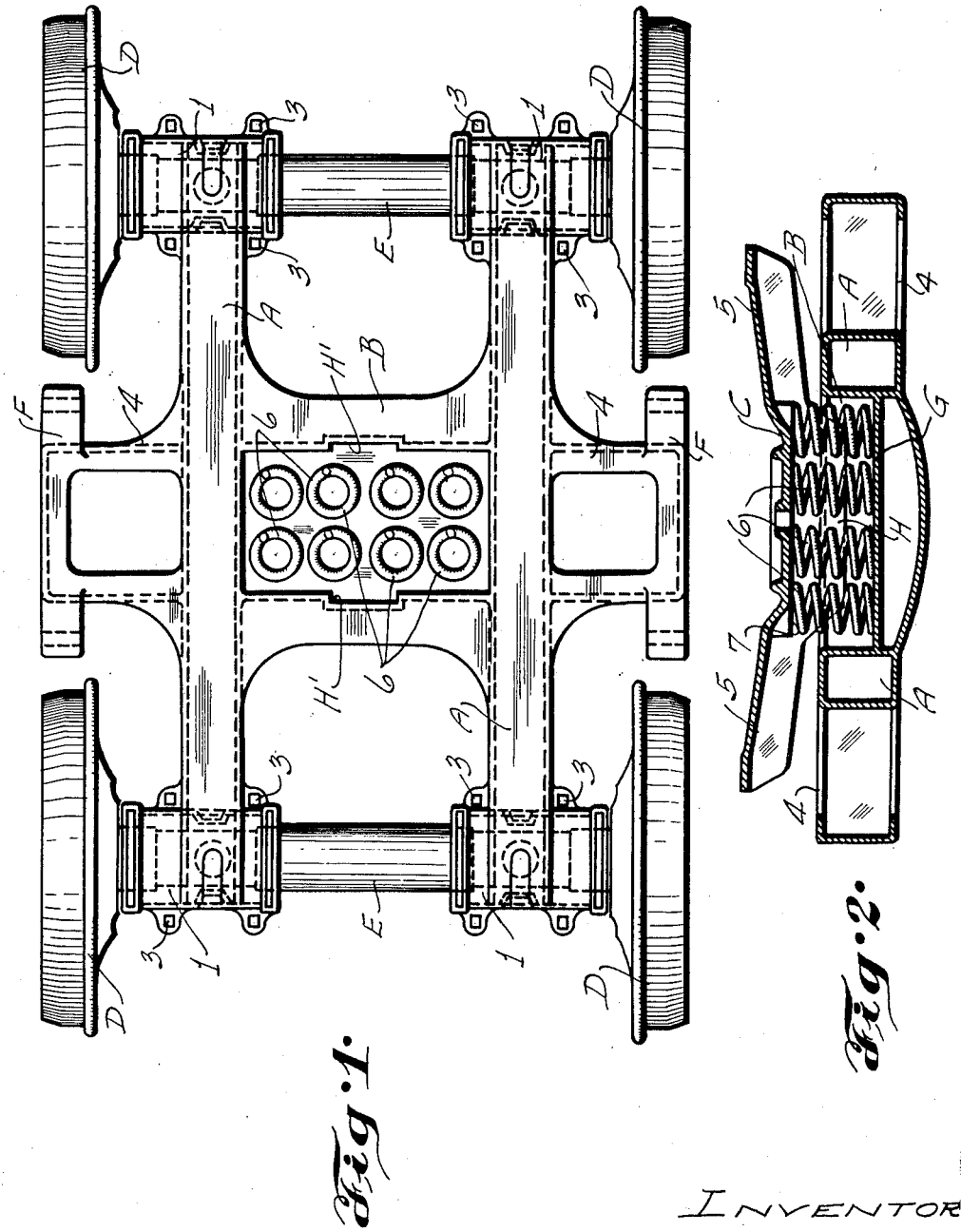

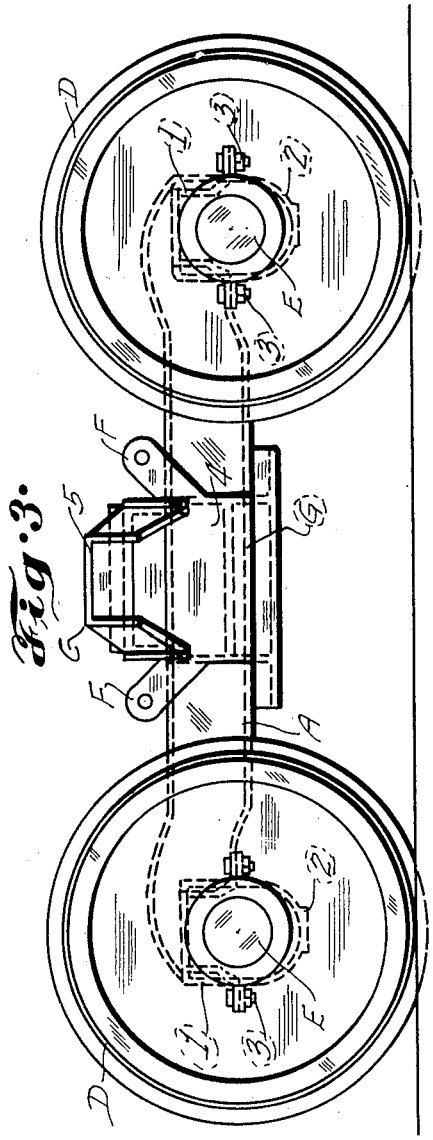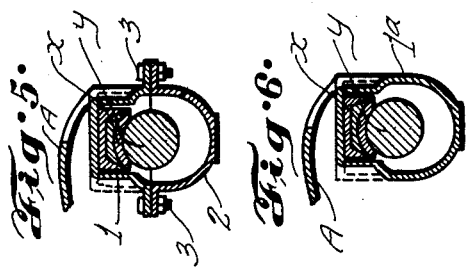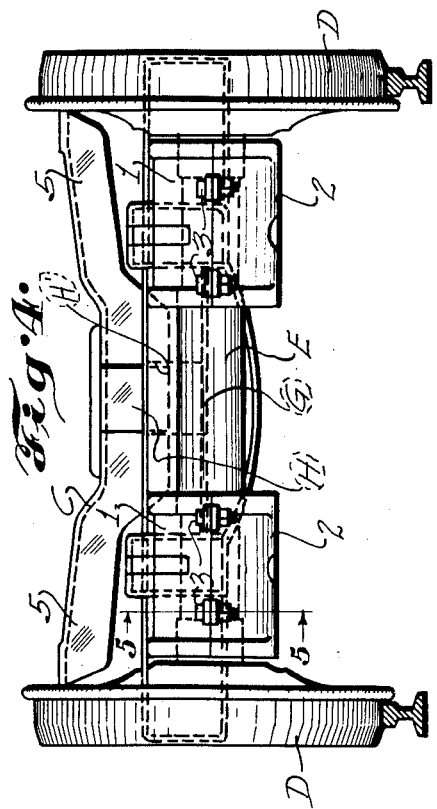

1,735,239

UNITED STATES PATENT OFFICE

HARRY E. DOERR, OF ST. LOUIS, MISSOURI, ASSIGNOR TO SCULLIN STEEL COMPANY, OF ST. LOUIS, MISSOURI, A CORPORATION OF DELAWARE

FREIGHT-CAR TRUCK OR TENDER TRUCK

Application filed August 4, 1927. Serial No. 210,645.

This invention relates to car trucks, and has for its main object to provide an inexpensive truck of simple design, that is adapted for use with freight cars and locomotive tenders.

My improved truck is distinguished from conventional freight car and tender trucks, principally in that the frame is cast in one piece and the side members of the frame are arranged inside of the wheels, or between the wheels, instead of outside of the wheels, as is the usual practice. The bolster of the truck is also of novel form and is supported on springs sustained by a spring plank or other suitable supporting means that is integrally connected with the side members of the frame.

Figure 1 of the drawings is a top plan view of my improved car truck with the truck bolster removed.

Figure 2 is a transverse sectional view of the truck with the truck bolster arranged in operative position.

Figure 3 is a side elevational view of the truck.

Figure 4 is an end elevational view.

Figure 5 is a transverse sectional view of one of the journal boxes taken on the line 5—5 of Figure 4; and Figure 6 is a cross-sectional view of a one-piece journal box.

In the accompanying drawings which illustrate one form of my invention, A designates the two longitudinally-disposed side members of the truck frame which are integrally connected to two transoms or tie members B that extend transversely of the truck at opposite sides of the truck bolster C. The side members A are arranged inside of or between the wheels D and are provided at their outer ends with journal boxes that carry journal bearings $x$ which rest upon journals $y$ on the axles E. The journal boxes can be of the divided type and each composed of a top part 1 integrally connected to the side member A and a removable bottom part 2 detachably connected by bolts 3 or in any other preferred manner to said top part 1, as shown in Figure 5, or the journal boxes can be of the one-piece type and each composed of a single part $1^a$ that is integrally connected to the side member with which it co-operates, as shown in Figure 6. The side members A of the frame can be substantially box-shaped in transverse cross section, or of any other preferred cross-sectional shape, and said members are provided intermediate their ends with integral, laterally-projecting portions 4 equipped with integral brake hangers F.

The bolster C, which is preferably of inverted channel shape in cross section, is provided with a central portion that fits between the transoms B of the frame, and end portions 5 that project laterally over the side members A of the frame, as shown in Figure 2. It is immaterial how said bolster is supported, but I have herein illustrated it as being mounted on spring 6 that are sustained by a sprink plank G, which is integrally connected to the side members A, the upper ends of the springs 6 contacting with a flat, horizontally-disposed spring seat 7 on the inside of the bolster. The bolster C is guided by vertically-disposed columns H, preferably integrally connected to the side faces of the bolster and located at the center of the bolster, and column guides H' formed by vertically-disposed grooves in the inner sides of the transoms B, as shown in Figure 1.

A car truck of the construction above described is inexpensive to manufacture, as the frame of same consists of an integral, one-piece casting, and the bolster also consists of a simple casting provided with integral column guides; it is exceptionally strong and rigid; and it is of such design that the parts of same can be easily assembled.

Having thus described my invention, what I claim as new and desire to secure by Letters Patent of the United States is:

1. In a truck for freight cars and tenders, the combination of a one-piece frame composed of side members arranged inside of the wheels and transversely disposed transoms integrally connected to said side members, and a bolster arranged to move vertically between said transoms and provided with end portions that project laterally over said side members.

2. A truck for freight cars and tenders, provided with a one-piece frame composed of side members arranged inside of the wheels and transoms integrally connected to said side members, a bolster having a center portion arranged to move vertically between said transoms and end portions that project laterally over said side members, and co-operating means on said bolster and transoms for guiding the bolster.

3. A truck for freight cars and tenders, provided with a one-piece frame composed of side members arranged inside of the wheels and transoms integrally connected to said side members, a bolster having a center portion arranged to move vertically between said transoms and end portions that project laterally over said side members, springs that support said bolster, and an integral means on the truck frame that sustains said springs.

4. A truck for freight cars and tenders, provided with a one-piece frame composed of side members arranged inside of the wheels and transoms integrally connected to said side members, a bolster having a center portion arranged to move vertically between said transoms and end portions that project laterally over said side members, springs that support said bolster, integral means on the truck frame that sustains said springs, laterally-projecting portions on said side members provided with integral brake hangers, and columns on the bolster that co-operate with column guides on said transoms.

5. A truck for freight cars and tenders, provided with a one-piece frame composed of side members arranged inside of the wheels and transoms integrally connected to said side members, journal boxes arranged at the ends of said side members, a bolster arranged to move vertically between said transoms, a spring plank integrally connected to said frame, and springs on said plank for supporting the bolster.

6. A truck for a freight car or tender, provided with a one-piece frame comprising side members arranged inside of the wheels and transversely-disposed transoms, a bolster of substantially inverted channel shape in cross section provided with a central portion positioned between said transoms and end portions that project laterally over said side members, and supporting springs for said bolster arranged inside of same and sustained by a means on said frame.

7. A car truck, comprising a frame composed of side members, transoms and a spring sustaining means integrally connected together, journal boxes at the ends of said side members, axles provided with wheels arranged outside of the side members of the frame, a bolster arranged above said side members and provided with a central portion that is positioned between said transoms, vertical columns on said bolster, co-operating column guides on said transoms, and supporting springs for the bolster housed inside of same and resting upon the spring sustaining means of said frame.

HARRY E. DOERR.